March 28, 1944. G. G. FREYGANG 2,344,985
SEALING GASKET FOR SYPHON BOTTLES AND THE LIKE
Filed Sept. 12, 1939 2 Sheets-Sheet 1

INVENTOR.
GUSTAV G. FREYGANG
BY J. William Carson
ATTORNEY.

March 28, 1944.　　G. G. FREYGANG　　2,344,985
SEALING GASKET FOR SYPHON BOTTLES AND THE LIKE
Filed Sept. 12, 1939　　2 Sheets-Sheet 2
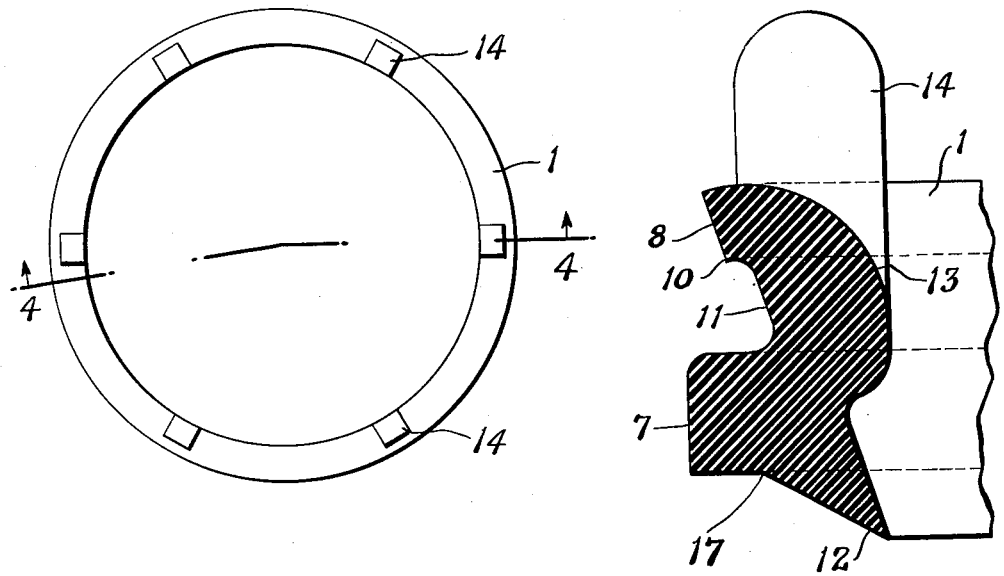
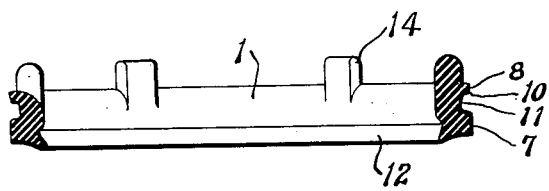
INVENTOR.
GUSTAV G. FREYGANG
BY J. William Carson
ATTORNEY.

Patented Mar. 28, 1944

2,344,985

UNITED STATES PATENT OFFICE 2,344,985

SEALING GASKET FOR SIPHON BOTTLES AND THE LIKE

Gustav G. Freygang, Weehawken, N. J., assignor to Specialties Manufacturing Company, Inc., Bloomfield, N. J., a corporation of Delaware Application September 12, 1939, Serial No. 294,491

10 Claims. (Cl. 220—46)

This invention relates to sealing devices for fluid containers, and more particularly to gaskets of the type employed for sealing vessels confining fluids under pressure, such as siphon bottles for carbonated beverages.

Siphon bottles, of the type referred to, ordinarily comprise a container or body shell which may have a relatively large mouth, a closure or cover part adapted to fit over the mouth of the container, and some form of packing or sealing means between the container and the closure.

It has been proposed to employ gaskets in which the sealing effect is dependent on a relatively heavy initial mechanical compression of the gasket followed by a completion of the seal by fluid pressure within the siphon bottle; but gaskets heretofore used have not been very successful in accomplishing the desired result because of the lack of uniformity of the force of compression due to the human factor involved in attaching the closure to the container and because of the quick deterioration of the gasket under the relatively heavy distorting compression. In addition bottles having gaskets under a considerable initial compression are difficult to open in proportion to the force used to compress the gasket.

In accordance with the present invention, it is an object to overcome these difficulties by employing a gasket requiring only a slight initial compression caused to be uniform for each application by the provision of means for limiting the initial compression at a desired point, the main sealing effort being supplied by the pressure of the fluid within the siphon bottle; and whereby by reason of this construction, the bottle is both easy to close and easy to open.

The operating conditions of siphon bottles or containers require that for the major part of the time they confine fluids under considerable pressure, such pressure being necessary for a successful operation of the siphon bottle. Ordinary mechanical seals, unless very strongly compressed, are prone to develop leaks which permit the fluid pressure to escape.

It is, therefore, also an object of the invention to provide a gasket which is so constructed that the pressure within the container will aid the sealing action of the gasket in proportion to its magnitude.

Since the use of containers for carbonated beverages, in connection with which the gasket is most likely to be applied, is a very wide one, it may happen that gaskets are placed incorrectly into the bottles, say in an inverted position, with a subsequent loss of pressure and consequent inoperativeness of the container.

In view thereof, it is a further object to provide a gasket which will permit of the effective closing of the container only when it is in its proper position with respect thereto.

These and other objects will be evident as the device is described in detail in connection with the accompanying drawings, in which:

Figure 2 is a fragmentary view of the gasket of the present invention showing an enlarged vertical cross section thereof.

Figure 3 is a top plan view of the gasket, while Figure 4 is a view in elevation of the gasket of Figure 3, sectioned on line 4—4.

Figure 1:
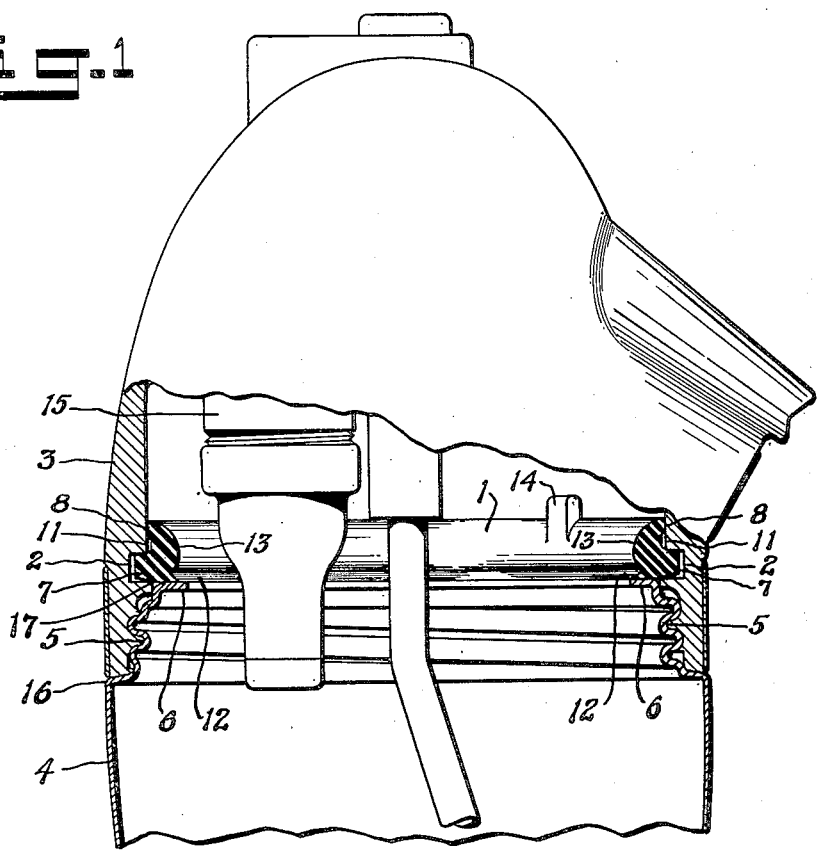
Figure 1 is a fragmentary view in partial longitudinal cross section of a representative type of siphon container to which the gasket of this invention is shown applied.

Referring now to the drawings, where the same numerals refer to the same elements, the gasket of the present invention, made of a pliable and resilient material such as rubber, is shown at 1 fitted into a groove 2 of a closure or head 3. The closure 3 is adapted to be threaded over a container shell 4 by means of screw threads 5. The shell 4 is formed at its open end or mouth with an inwardly extending horizontal flange or shoulder 6 adapted to serve as a supporting and uplifting base for a normally depending wedge-like lip 12 of the gasket 1. At 15 is indicated a holder for a small container or cartridge of liquid carbon dioxide, which container upon proper manipulation is adapted to release gas under pressure into the container or bottle proper. A shoulder 16 is seen to be formed in the container shell 4 adapted to act as a stop for the closure or head 3 when the head is screwed over the container shell 4 and adapted to determine the ultimate position of flange 6 with respect to the closure 3 and the gasket 1. As the siphon bottle is shown for illustrative purposes only and does not form any part of the invention, further details of its construction and operation will not be considered. The gasket as shown in Figure 1, portrays a "no pressure" condition within the siphon.

In Figure 2, the gasket 1, shown in section, is seen to have a rectangular body formation 7 forming its outer periphery and adapted to fit loosely into the complementarily-shaped groove 2 (Figure 1) of the closure or head 3, thus serving to act as a supporting means for the entire gasket. One of the effective sealing surfaces of the gasket is indicated at 8 and is seen to be somewhat inclined outwardly from the vertical. In order to keep its sealing area small, the sealing surface 8 is cut away at 10, whereby an annular groove 11 is formed. The groove 11 is inclined from the vertical at substantially the same angle as the surface 8. The nethermost portion of the gasket 1 is formed with a wedge-shaped lip 12 pointing downwardly and inwardly and merging at 17 with the body formation 7. The under side of the lip 12 is adapted to cooperate with shoulder 6 and provides the other effective sealing surface of the gasket. The surface 8 and the groove 11 are backed by an extra heavy section or formation 13, which has an approximately arcuate contour and merges directly into lip 12.

The gasket is thus seen to comprise a substantially rectangular-sectioned portion or body formation 7, an arcuate and outwardly concave wall portion indicated by 8, 11 and 13, and a depending lip 12, all having separate and distinct functions.

In views of Figures 3 and 4, gasket 1 is seen to be an annular ring provided with lugs or projections 14, which are evenly spaced circumferentially around the top portion of the inner periphery of the ring.

The sealing action of the gasket will now be explained in conjunction with Figures 1, 5 and 6.

Figure 5:
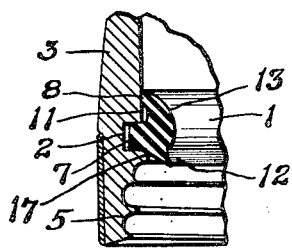
Figure 5 is a fragmentary vertical sectional view illustrating a portion of the container closure and showing the formation of the gasket before the closure has been applied to the container.

Figure 5 depicts the gasket 1 loosely positioned in the groove 2 of the closure or head 3 before the closure is applied to the container shell 4. The ring-formed gasket at the upper periphery of the surface 8 is of a somewhat larger diameter than the inside diameter of the closure, and is therefore subject to an inherent radial compression as soon as it is placed in the position, as shown in Figure 5. As a consequence of this radial compression, an initial mechanical seal with the inside of the closure 3 is obtained by the sealing surface or ring 8. Due to the upward and outward slope of the surface 8, the whole gasket is positioned in groove 2 tilted somewhat radially inwardly, the rectangular formation 7 being just a little short of filling out the groove 2, and the merging point 17 between the body formation 7 and the lip 12 approximately coincident with the edge of the floor of the groove 2.

The next step of the sealing operation is illustrated in Figure 1, wherein the closure 3 is shown applied to the container shell 4. The shoulder 16 of the container shell 4, as already pointed out, is intended to stop the closure 3 from going any further when flange 6 has attained a desired position with respect to the gasket 1 and when the top of the flange is even with the floor of the groove 2. When the closure 3 is threaded over the container shell 4, the flange 6 pushes the lip 12 up into a horizontal position, whereby the entire gasket is straightened out from its original tilted position, that is, it is pushed upwardly somewhat and each sectional plane thereof is turned outwardly around a pivot point the locus of which lies within the groove 2.

This is in contrast to other gaskets which seal primarily due to their being mechanically compressed when the closure is applied. As the flange 6 cannot go further than up to a predetermined point with respect to groove 2, the resisting force of lip 12 with respect to the flange 6 is predetermined and always the same, resulting in a mechanical sealing force of a fixed magnitude acting on the wall of the closure 3 as transmitted to the sealing surface 8 from the lip 12 through the arcuate formation 13. As a consequence of the foregoing, a preliminary and fairly tight seal will be established, separating by means of the ring-formed seals at 8 and 12 the inside of the container proper from an outside region or zone of the gasket 1. This zone is delimited by the lower edge 10 of the ring-formed sealing surface 8 and at 17 on the nether surface of the body formation 7 where the formation merges with the lip 12, approximately.

These initial mechanical seals are achieved, as already pointed out, as soon as the gasket 1 is placed in position into the groove 2 of the closure 3, first along surface 8, and finally, when the flange 6 makes contact with the lip 12 upon closing of the container shell 4. Because of the presence of the groove 11 and the relatively smaller outside diameter of the body formation 7 with respect to that of groove 2, there is formed a sealed-off, confined and chambered space between the inside of the closure 3 and the outside of the gasket 1, as defined above.

Figure 6:
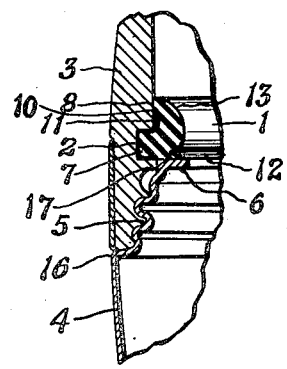
Figure 6 shows in fragmentary section a portion of the closed container and the gasket when there is pressure in the container.

The last step of the sealing operation is illustrated in Figure 6. Here, fluid pressure has been established within the container, generally of the order of 175 pounds per square inch. This hydraulic pressure is effective against the inner or exposed side of the gasket, resulting in strong compression of the lip 12 against the flange 6, and in a substantial, although not complete flattening out of the arched formation 13 and with it of the groove 11 against the inside wall of the closure 3. The surface 8, having only a fraction of the area as compared to the total area of the gasket portion above the formation 7 due to the presence of groove 11, and having the smallest contact surface of the entire device, is thus subjected to a relatively more intense unit pressure than any other part of the gasket; this is similarly true; although to a lesser extent, of the under side of lip 12, which is also the object of a comparatively high unit pressure. The extra heavy section of the gasket at 13 serves at this time to prevent a collapse of the wall of the groove 11 due to the pressure in the siphon. Due to the above defined initial mechanical seals established along the upper and lower edges of the outside of the gasket respectively, the fluid pressure medium, now present in the container, is prevented from penetrating between the gasket and the closure 3, and is thus prevented from possibly building up a back pressure there which would oppose and weaken the action of the fluid pressure acting on the inside of the gasket and tending to establish a hydraulic seal in addition to the mechanical seal already present.

As a matter of fact, when fluid pressure is introduced into the container any air or fluid medium in the sealed-off space back of the gasket is compressed and substantially vented out to the atmosphere between the closure 3 and the container shell 4 past the threads 5. By virtue, therefore, of the seals initially established along the upper and lower edges of the outside of the gasket, a sealed-off region or space of comparatively low pressure is created there in contrast to the high pressure prevailing on the inside of the gasket, a condition very conducive to a good hydraulic seal and very effective in preventing leakage from the container thus sealed. It is seen, therefore, that without actually having to confine or to positively compress the gasket, the operating conditions of the container and the construction of the gasket itself are instrumental in effecting a tight mechanical and hydraulic seal without any application of outside force beyond the normal closing effort, insuring an easy opening of the bottle when desired, especially since no "over-closing" is possible due to the presence of the stop-shoulder 16.

In the general public use of siphon bottles and other apparatus using this gasket, there is always the chance that the gasket will at times be put into the closure-head upside down. In a case of this sort, a seal will be made prematurely, that is, before the head 3 is fully screwed down over the shell 4 and has taken proper hold of the threads 5, with the attendant danger that the pressure within the container may cause the head to blow off. In order to avoid this possibility, the provision is made in my gasket to make sealing impossible, even partially, when the gasket has been inserted incorrectly. This is accomplished by means of lugs or projections 14. When the gasket is inserted upside down, the flange 6 will contact these lugs as the head is screwed over the container shell, and will force the gasket into a skew position, which will not allow it to seal properly.

In consideration of the fact that the uppermost portion of the gasket, which includes the sealing surface 8, has the function of forming a continuous seal with the inside wall of the closure 3 to prevent any fluid medium from penetrating into the low pressure area between the gasket and the closure, as described above, lugs 14, since they tend to produce local structural stiffness in the gasket, are made to project from the inner periphery of the arcuate formation 13 of the gasket, thus leaving the upper edge of the sealing ring or surface 8 sufficiently pliable and structurally unhampered to follow the contour of the wall of the closure 3 to assure an unbroken and effective seal along the ring-formed sealing surface 8.

It will be evident to one skilled in the art that changes may be made in the gasket of my invention, as well as in the design and type of container used therewith, without departing from the scope of the invention, as expressed in the appended claims.

I claim:

1. A sealing gasket of resiliently compressible material comprising an annular body, a wedge-shaped lip depending from the circumferential inner portion of said body with its apex pointing inwardly and adapted to engage a substantially horizontal surface and to be compressed upwardly thereby to make a seal therewith, an arcuate wall-like formation, outwardly concave, extending substantially upwardly from and all around said body, forming on its outer side an acute angle with the horizontal, and adapted along its upper outer surface for a distance less than its whole height to engage a substantially vertical surface to make a seal therewith as a consequence of the upward compression of said lip by said substantially horizontal surface, and a plurality of vertically extending projections formed on top of said arcuate formation and circumferentially spaced thereon along its inner periphery to prevent proper sealing when the gasket is so placed that said arcuate form rather than said lip makes contact with a horizontal surface.

2. In combination with a container for a fluid under pressure comprising a container shell and a closure therefor adapted to be threaded thereon, said shell having a horizontal inwardly extending flange at its top, and said closure having on its inside a groove to receive a gasket, a sealing gasket of resiliently compressible material comprising an annular body having a section substantially conforming to that of the groove and adapted to be supported therein, a wedge-shaped lip normally depending from the circumferential inner portion of said body with its apex pointing inwardly and adapted to be engaged by said flange and to be compressed upwardly into a horizontal position thereby to make a seal therewith, and an arcuately sectioned upper seal-making formation, outwardly concave, extending substantially upwardly from and all around said body, having an outwardly inclined outer sealing surface, said body and arcuate formation adapted to be rotated outwardly in each of their vertical sectional planes and into an intense sealing contact along said sealing surface for a distance less than the whole height of said formation with the vertical inside wall of the closure as a consequence of the upward thrust on said lip by said flange when the closure is screwed onto the container, the locus of the pivot points of said sectional planes being within the section of said annular body.

3. In combination with a container for a fluid under pressure comprising a container shell and a closure therefor adapted to be threaded thereon, said shell having a horizontal inwardly extending flange at its top, and said closure having on its inside a groove to receive a gasket, a sealing gasket of resiliently compressible material comprising an annular body having a section substantially conforming to that of the groove and adapted to be supported therein, a wedge-shaped lip normally depending from the circumferential inner portion of said body with its apex pointing inwardly and adapted to be engaged by said flange and adapted to be compressed upwardly into a horizontal position thereby to make a seal therewith, an arcuately sectioned upper seal-making formation, outwardly concave, extending substantially upwardly from and all around said body, having an outwardly inclined outer sealing surface, said body and arcuate formation adapted to be rotated outwardly in each of their vertical sectional planes and into an intense sealing contact along said sealing surface for a distance less than the whole height of said formation with the vertical inside wall of the closure as a consequence of the upward thrust on said lip by said flange when the closure is screwed onto the container, the locus of the pivot points of said sectional planes being within the section of said annular body, and a plurality of vertically extending projections formed on top of said arcuate formation and circumferentially spaced thereon along its inner periphery to prevent proper sealing when the gasket is so placed that said arcuate form rather than said lip makes contact wtih said flange.

4. A sealing gasket of resiliently compressible material comprising an annular body, a wedge-shaped lip depending from the circumferential inner portion of said body, and an arcuately sectioned upper seal-making formation extending upwardly from and all around the circumferential inner portion of said body and curving outwardly to terminate in a flat out-of-vertical sealing surface, said upper formation being recessed on its outer side for a substantial portion of its height to confine the sealing surface to its upper portion.

5. An annular sealing gasket of resiliently compressible material comprising a body having a diameter larger than other portions of the gasket, a lower wedge-shaped seal-making formation depending from said body with its apex pointing inwardly, and an upper seal-making formation extending upwardly from said body having an outwardly inclined out-of-vertical sealing surface.

6. An annular sealing gasket of resiliently compressible material comprising a body having a diameter larger than other portions of the gasket, a lower wedge-shaped seal-making formation depending from said body with its apex pointing inwardly, and an upper arcuately sectioned seal-making formation outwardly concave extending upwardly from said body having an outwardly inclined out-of-vertical sealing surface.

7. An annular sealing gasket of resiliently compressible material comprising a body having a diameter larger than other portions of the gasket, a lower wedge-shaped seal-making formation depending from said body with its apex pointing inwardly, and an upper arcuately sectioned seal-making formation outwardly concave extending upwardly from said body having an outwardly inclined out-of-vertical sealing surface along its uppermost portion for a fraction of its height.

8. An annular sealing gasket of resiliently compressible material comprising a body having a diameter larger than other portions of the gasket, a lower wedge-shaped seal-making formation depending from said body with its apex pointing inwardly, an upper seal-making formation extending upwardly from said body having an outwardly facing sealing surface, and a plurality of vertically extending projections formed on top of said upper formation and circumferentially spaced thereon along its inner periphery to prevent proper sealing when the gasket is applied improperly.

9. For use with a container closure having a gasket supporting groove on the inside of its vertical wall, a sealing gasket of resiliently compressible material comprising an annular body shaped substantially in correspondence with said groove of a larger diameter than other parts of the gasket and adapted for reception therein, a wedge-shaped lower seal-making formation depending from the circumferential inner portion of said body, and an arcuately sectioned upper seal-making formation extending upwardly from the circumferential inner portion of said body and curving outwardly to terminate in a flat out-of-vertical outwardly inclined sealing surface, said upper formation being recessed on its outer side for a substantial portion of its height to confine the sealing surface to its upper portion, whereby, due to said outward inclination of the said upper formation upon insertion of said annular body into said groove said inclined upper sealing surface makes a relatively intense ring-formed sealing contact with said vertical closure wall.

10. In combination, a container shell for a fluid under pressure having a seal-forming surface at the mouth thereof; a closure for the shell having an annular gasket supporting groove at the interior thereof; and an annular sealing gasket of resiliently compressible material provided with a body having a diameter larger than other portions of the gasket and being disposed in the annular groove of said closure, a lower wedge-shaped seal-making formation normally depending from said body and being distorted upwardly to engage the surface at the upper end of said container shell, and an upper seal-making formation extending upwardly from said body having an outwardly inclined out-of-vertical sealing surface adapted to engage the interior of said closure above the annular groove thereof.

GUSTAV G. FREYGANG.